United States Patent
Oel et al.

(10) Patent No.: US 9,464,908 B2
(45) Date of Patent: Oct. 11, 2016

(54) APPARATUS, SYSTEM AND METHOD FOR CLUSTERING POINTS OF INTEREST IN A NAVIGATION SYSTEM

(71) Applicants: VOLKSWAGEN AG, Wolfsburg (DE); AUDI AG, Ingolstadt (DE)

(72) Inventors: Peter Oel, Rühen (DE); Henry Chen, Los Altos, CA (US); Chuhee Lee, Belmont, CA (US)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 0 days.

(21) Appl. No.: 14/482,630

(22) Filed: Sep. 10, 2014

(65) Prior Publication Data

US 2016/0069697 A1    Mar. 10, 2016

(51) Int. Cl.
| | |
|---|---|
| G01C 21/00 | (2006.01) |
| G01C 21/10 | (2006.01) |
| G01C 21/34 | (2006.01) |
| G01C 21/36 | (2006.01) |

(52) U.S. Cl.
CPC ....... G01C 21/3476 (2013.01); G01C 21/3605 (2013.01)

(58) Field of Classification Search
CPC .. G01C 21/00; G01C 21/10; G01C 21/3476; G01C 21/3605; G01C 21/3679; G01C 21/3682; G08G 1/096827; G08G 1/0969; G06F 17/30241
USPC ........................................................ 701/426
See application file for complete search history.

(56) References Cited

U.S. PATENT DOCUMENTS

| | | | |
|---|---|---|---|
| 6,542,812 B1 | 4/2003 | Obradovich et al. | |
| 6,775,613 B2 | 8/2004 | Burt et al. | |
| 7,751,968 B2 | 7/2010 | Yamada et al. | |
| 7,751,971 B2 * | 7/2010 | Chang | G01C 21/30 340/686.1 |
| 8,239,130 B1 * | 8/2012 | Upstill | G01C 21/3679 701/400 |
| 8,249,805 B2 | 8/2012 | de Silva et al. | |
| 8,401,771 B2 * | 3/2013 | Krumm | G01C 21/20 340/988 |
| 8,433,512 B1 * | 4/2013 | Lopatenko | G01C 21/20 701/400 |
| 8,566,029 B1 * | 10/2013 | Lopatenko | G08G 1/0962 701/400 |
| 8,589,069 B1 * | 11/2013 | Lehman | G01C 21/20 340/995.1 |
| 9,047,691 B2 * | 6/2015 | van Os | G01C 21/3611 |
| 9,087,412 B2 * | 7/2015 | Fulks | G06T 11/60 |
| 9,104,293 B1 * | 8/2015 | Kornfeld | G06F 3/04817 |
| 2002/0130906 A1 * | 9/2002 | Miyaki | G01C 21/3664 715/837 |
| 2004/0204821 A1 * | 10/2004 | Tu | G01C 21/3679 701/527 |
| 2007/0116357 A1 * | 5/2007 | Dewaele | G06K 9/3233 382/173 |
| 2007/0208495 A1 * | 9/2007 | Chapman | G08G 1/0104 701/117 |
| 2008/0097698 A1 * | 4/2008 | Arnold-Huyser | G08G 1/0969 701/300 |
| 2009/0005987 A1 * | 1/2009 | Vengroff | G06Q 30/02 701/300 |
| 2010/0114478 A1 * | 5/2010 | Bai | G09B 29/102 701/408 |
| 2010/0185642 A1 * | 7/2010 | Higgins | G06F 17/30867 707/758 |

(Continued)

*Primary Examiner* — Atul Trivedi
(74) *Attorney, Agent, or Firm* — Barnes & Thornburg LLP (57) ABSTRACT

A navigation system, apparatus and method utilizing a processor and a sensor, operatively coupled to the processor to determine a location of the navigation system. An input is configured to receive destination data, specifying a destination, and point-of-interest (POI) data from a user, wherein the processor is configured to process the destination data and the POI data to determine a plurality of POIs that are in closest proximity to the destination and clustering the POIs for presentation on a navigational map. The processor may be further configured to generate a route from the location of the navigation system, the destination and at least one of the POIs in the navigational map based on at least one of speed and distance.

11 Claims, 6 Drawing Sheets

(56) References Cited

U.S. PATENT DOCUMENTS

| | | | |
|---|---|---|---|
| 2010/0217525 A1* | 8/2010 | King | G06Q 30/02 701/300 |
| 2010/0305842 A1* | 12/2010 | Feng | G06F 17/3087 701/533 |
| 2011/0087431 A1* | 4/2011 | Gupta | H01S 5/02 701/408 |
| 2011/0151898 A1* | 6/2011 | Chandra | H04W 4/02 455/466 |
| 2011/0172911 A1* | 7/2011 | Hurley | G01C 21/32 701/465 |
| 2011/0191019 A1* | 8/2011 | Holsinger | G01C 21/00 701/533 |
| 2011/0208425 A1* | 8/2011 | Zheng | G01S 19/14 701/532 |
| 2011/0238690 A1* | 9/2011 | Arrasvuori | G06F 3/04812 707/769 |
| 2013/0060462 A1* | 3/2013 | Hansen | G01C 21/3476 701/424 |
| 2013/0073988 A1* | 3/2013 | Groten | G06Q 30/02 715/753 |
| 2013/0093787 A1* | 4/2013 | Fulks | G06T 11/60 345/629 |
| 2013/0127980 A1* | 5/2013 | Haddick | G06F 3/013 348/14.08 |
| 2013/0166196 A1* | 6/2013 | Narasimha | G01C 21/3682 701/426 |
| 2013/0262479 A1* | 10/2013 | Liang | H04W 4/021 707/748 |
| 2013/0321466 A1* | 12/2013 | Kocienda | G01C 21/26 345/635 |
| 2013/0337830 A1* | 12/2013 | Haro | H04W 4/02 455/456.1 |

* cited by examiner

APPARATUS, SYSTEM AND METHOD FOR CLUSTERING POINTS OF INTEREST IN A NAVIGATION SYSTEM

BACKGROUND

The present disclosure is directed to navigation devices and systems. More specifically, the present disclosure is directed to navigational processing for efficiently identifying and/or clustering points of interest (POI) on a navigational map.

Navigation systems are electronic, processor-based systems that aid in navigation. Navigation systems may be configured to be entirely on board a vehicle or vessel, or they may be located elsewhere and communicate via radio or other signals with a vehicle or vessel, or they may use a combination of these methods. Navigation systems may also be configured within a portable device, such as a laptop, smart phone, tablet and the like. Navigation systems may be capable of containing maps, which may be displayed in human readable format via text or in a graphical format, determining a vehicle or vessel's location via sensors, maps, or information from external sources, providing suggested directions to a human in charge of a vehicle or vessel via text or speech, providing directions directly to an autonomous vehicle such as a robotic probe, providing information on nearby vehicles or vessels, or other hazards or obstacles, and providing information on traffic conditions and suggesting alternative directions.

In existing navigation systems, users are capable of searching for POIs. However, users cannot efficiently search for multiple POIs simultaneously using generic names (e.g., "gas station", "bank", "restaurant") and/or names specific to a generic category (e.g., "BP", "Bank of America", "TGI Fridays"). Furthermore, there are no existing systems that can intelligently cluster multiple POI results and process the results into an efficient routing for the user.

SUMMARY

Various apparatus, systems and methods are disclosed for processing navigational data such as POIs, which may be generically or specifically defined by the user, and clustering the data into groups in order to produce navigational routes that are optimized by speed and/or distance. Users may further be given the option to modify clustering results to provide further customization.

Under one exemplary embodiment, a navigation system is disclosed, comprising a processor, a sensor, operatively coupled to the processor, the sensor being configured to determine a location of the navigation system; an input, operatively coupled to the processor, wherein the input is configured to receive destination data, specifying a destination, and point-of-interest (POI) data from a user, and wherein the processor is configured to process the destination data and the POI data to determine a plurality of POIs that are in closest proximity to the destination and clustering the POIs for presentation on a navigational map. The POI data may comprise generic POIs or specific POIs that are associated with one or more generic POIs, wherein the processor may be configured to cluster at least one of a plurality of generic and specific POIs. The processor may be further configured to generate a route from the location of the navigation system, the destination and at least one of the POIs in the navigational map based on at least one of speed and distance. In one embodiment, the system may further include communications configured to transmit at least one of the location, destination and POIs to a remote navigation system. In another embodiment, the system processor may be configured to determine if the plurality of POIs that are in closest proximity to the destination are within a predetermined threshold distance, and determine at least one alternate POI that is in closest proximity to the destination based on the predetermined threshold distance.

In another exemplary embodiment, a processor-based method is disclosed for operating a navigation system, the method comprising determining a location of the navigation system; receiving destination data, specifying a destination, and point-of-interest (POI) data; and processing, in a processor, the destination data and the POI data to determine a plurality of POIs that are in closest proximity to the destination and clustering the POIs for presentation on a navigational map. In one exemplary embodiment, the POI data comprises generic POIs and/or specific POIs that are associated with one or more generic POIs, and wherein the clustering comprises clustering at least one of a plurality of generic and specific POIs. The method may further comprise generating a route from the location of the navigation system, the destination and at least one of the POIs in the navigational map based on at least one of speed and distance. In another embodiment, the method may comprise transmitting at least one of the location, destination and POIs to a remote navigation system. In another embodiment, the method may comprise determining if the plurality of POIs that are in closest proximity to the destination are within a predetermined threshold distance and determining at least one alternate POI that is in closest proximity to the destination based on the predetermined threshold distance.

BRIEF DESCRIPTION OF THE FIGURES

The present invention is illustrated by way of example and not limitation in the figures of the accompanying drawings, in which like references indicate similar elements and in which.

DETAILED DESCRIPTION

Various embodiments will be described herein below with reference to the accompanying drawings. In the following description, well-known functions or constructions are not described in detail since they may obscure the invention in unnecessary detail.

It will be understood that the term "module" as used herein does not limit the functionality to particular physical modules, but may include any number of software and/or hardware components. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via C, C++, C#, Java, Actionscript, Objective-C, Javascript, CSS, XML, etc.).

Figure 1:
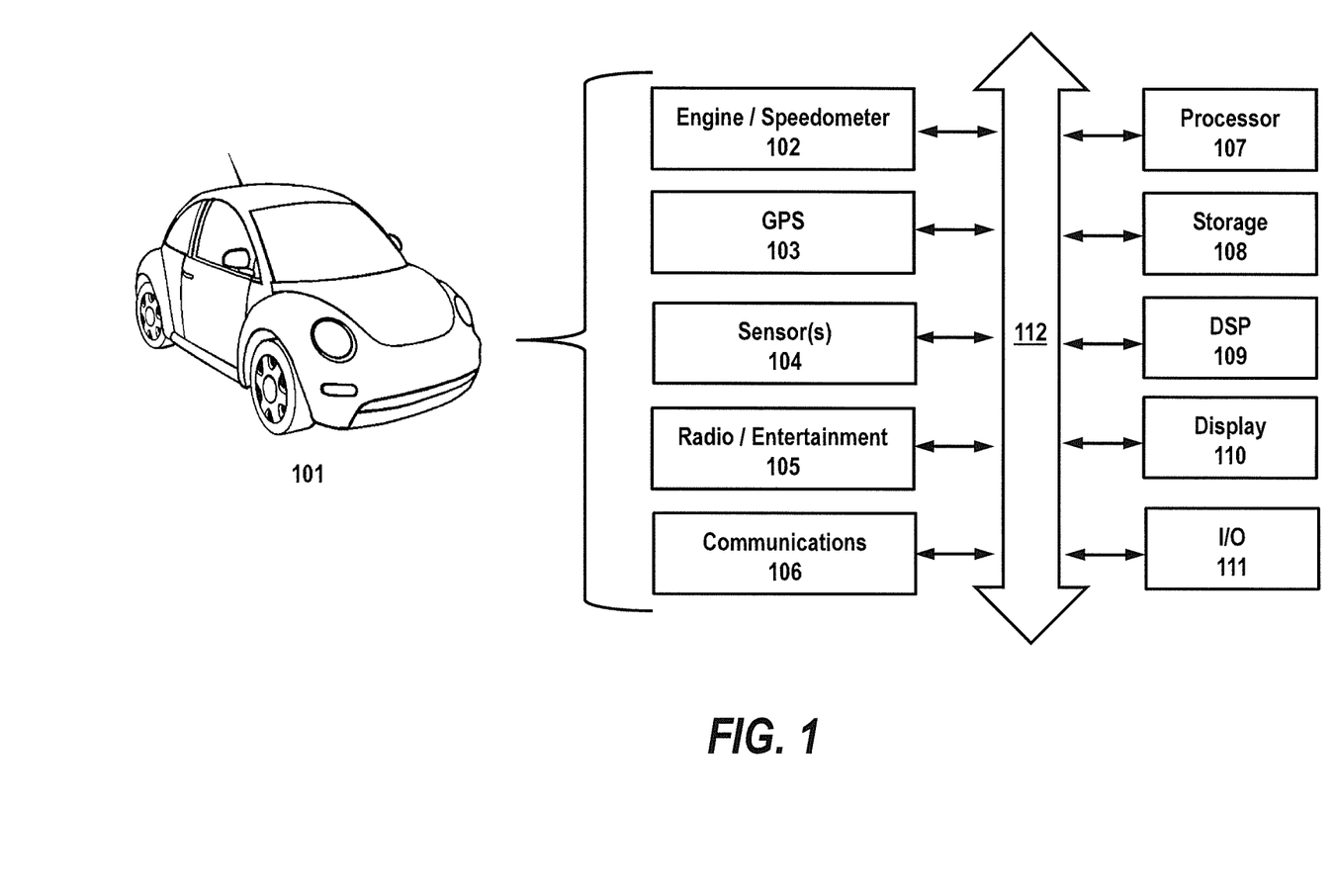
FIG. 1 illustrates an exemplary vehicle system block diagram showing multiple components and modules, together with a navigational system under one embodiment.

Turning to FIG. 1, the drawing illustrates an exemplary vehicle system 101 comprising various vehicle electronics modules, subsystems and/or components. Engine/transmission module 102 is configured to process and provide vehicle engine and transmission characteristic or parameter data, and may comprise an engine control unit (ECU), and a transmission control. For a diesel engine, module 102 may provide data relating to fuel injection rate, emission control, NOx control, regeneration of oxidation catalytic converter, turbocharger control, cooling system control, and throttle control, among others. For a gasoline engine, module 102 may provide data relating to lambda control, on-board diagnostics, cooling system control, ignition system control, lubrication system control, fuel injection rate control, throttle control, and others. Transmission characteristic data may comprise information relating to the transmission system and the shifting of the gears, torque, and use of the clutch. Under one embodiment, an engine control unit and transmission control may exchange messages, sensor signals and control signals.

Global positioning system (GPS) module 103 provides navigation processing (see FIG. 4) and location data for vehicle 10. Sensors 104 provides sensor data which may comprise data relating to vehicle characteristic and/or parameter data (e.g., from 102), and may also provide environmental data pertaining to the vehicle, its interior and/or surroundings, such as temperature, humidity and the like. Radio/entertainment module 105 may provide data relating to audio/video media being played in vehicle 101. Module 105 may be integrated and/or communicatively coupled to an entertainment unit configured to play AM/FM radio, satellite radio, compact disks, DVDs, digital media, streaming media and the like. Communications module 106 allows any of the modules to communicate with each other and/or external devices via a wired connection or wireless protocol, such as Wi-Fi, Bluetooth, NFC, etc. In one embodiment, modules 102-106 may be communicatively coupled to bus 112 for certain communication and data exchange purposes.

Vehicle 101 may further comprise a main processor 107 that centrally processes and controls data communication throughout the system of FIG. 1. Storage 108 may be configured to store data, software, media, files and the like. Digital signal processor (DSP) 109 may comprise a processor separate from main processor 107, or may be integrated within processor 107. Generally speaking, DSP 109 may be configured to take signals, such as voice, audio, video, temperature, pressure, position, etc. that have been digitized and then process them as needed. Display 110 may be configured to provide visual (as well as audio) indicial from any module in FIG. 1, and may be a configured as a LCD, LED, OLED, or any other suitable display. Display may also be configured with audio speakers for providing audio output. Input/output module 111 is configured to provide data input and outputs to/from other peripheral devices, such as key fobs, device controllers and the like. As discussed above, modules 107-111 may be communicatively coupled to data bus 112 for transmitting/receiving data and information from other modules.

Figure 2:
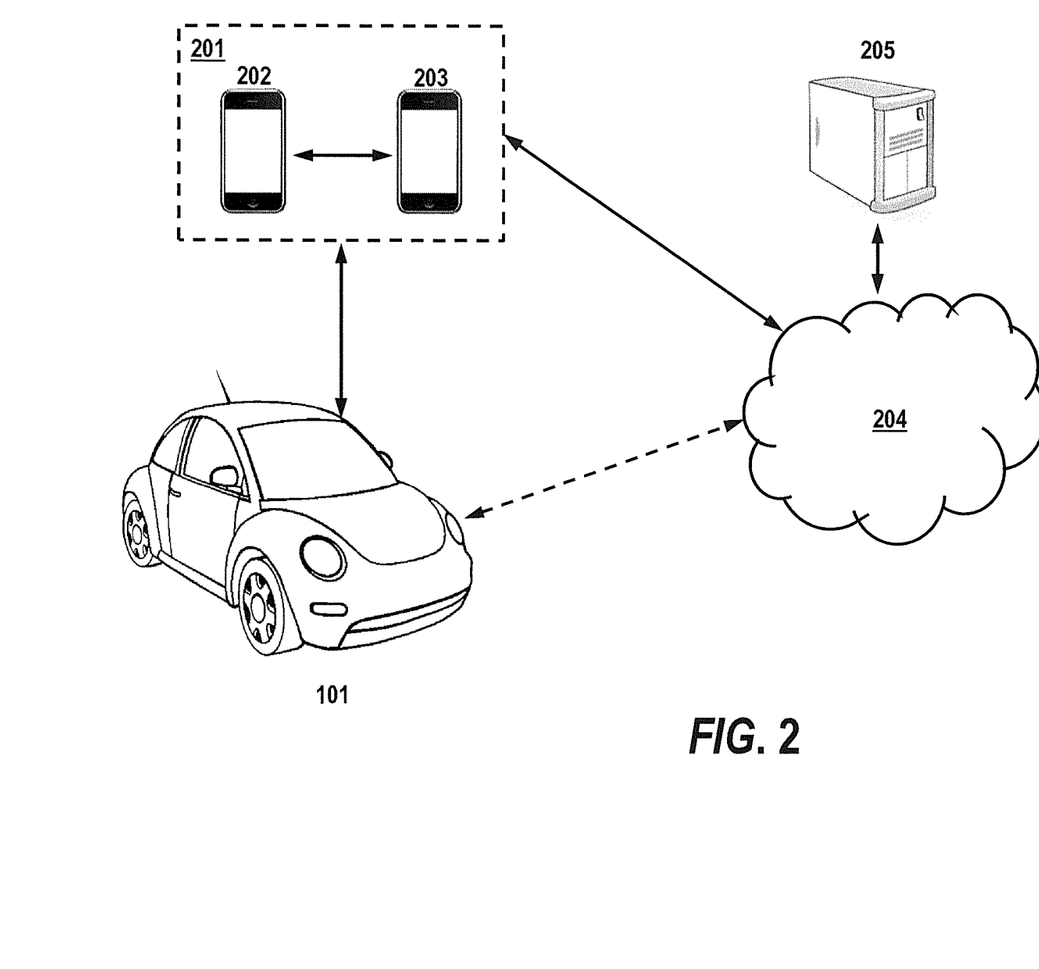
FIG. 2 is an exemplary block diagram illustrating the vehicle of FIG. 1 communicatively coupled to one or more portable devices and a computer network under one embodiment.

Turning to FIG. 2, an exemplary embodiment is illustrated, where a vehicle 101 (see FIG. 1), is paired with one or more devices 201 (202, 203) which may be registered to one or more users. Devices 201 may be registered with vehicle 101 using Bluetooth pairing or using WiFi or NFC registration, as is known in the art. Preferably, device 201 registrations are stored (e.g., 108) at the vehicle according to a device ID or SIM ID, and may further include a device user profile associated with each ID that may include demographic data, user interests, and/or user device/vehicle history. In the embodiment of FIG. 2, devices 202, 203 may configured to communicate navigational data with vehicle 101, and may be further configured to communicate with each other. Portable devices 201 are also configured to communicate with wireless network 204 in order to send/receive data from a central server 205. Similarly, in one embodiment, vehicle 101 may also be configured to communicate with network 204. Server 205 may be also configured to perform back-end processing for devices 201 and vehicle 101, and further communicate with other remote servers for additional functionalities, such as supplementary map data, navigational data, and the like.

Figure 3:
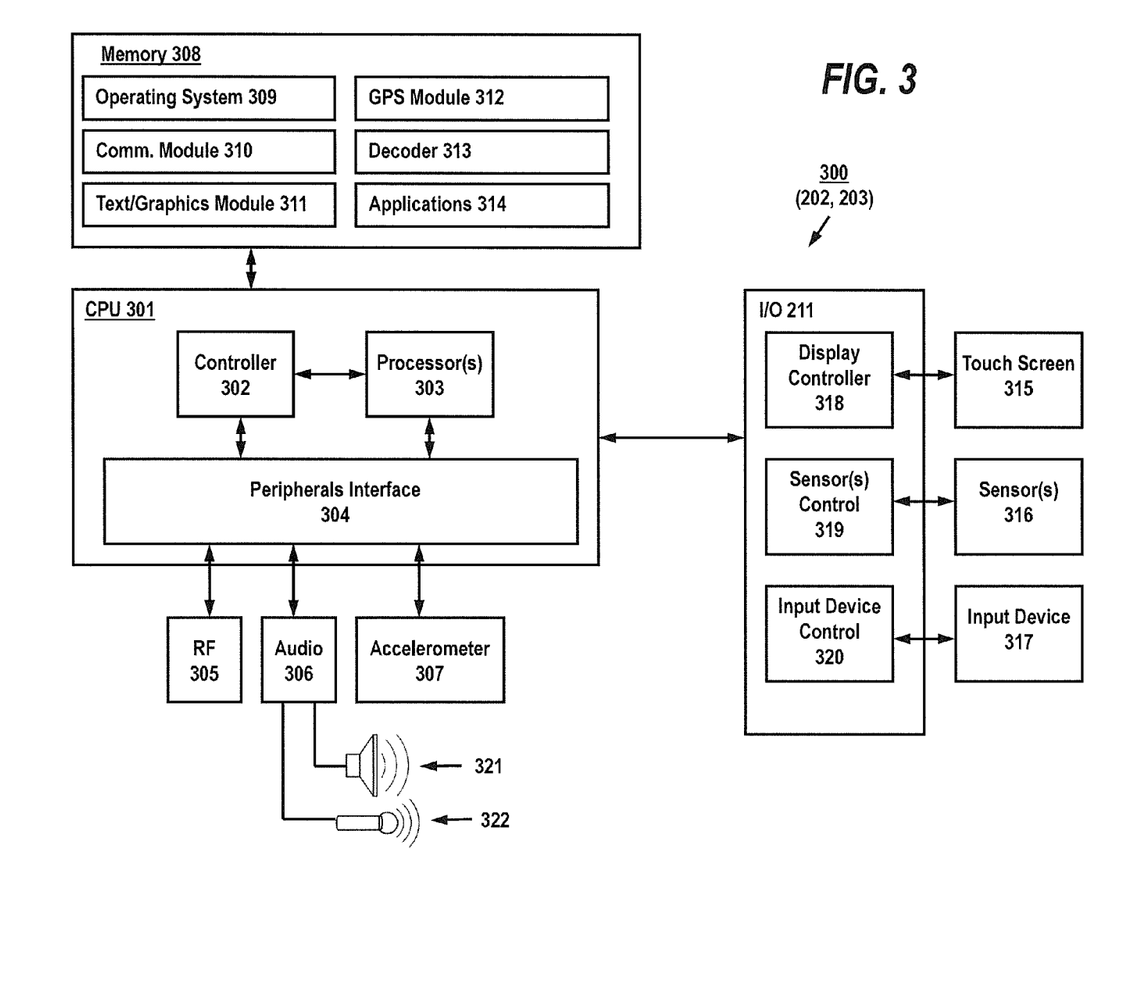
FIG. 3 is an exemplary block diagram illustrating components and modules of a portable device, configured for navigation and navigational processing and further configured to operate in the exemplary system of FIG. 2 under one embodiment.

FIG. 3 is an exemplary embodiment of a portable computing device 300 (such as devices 202, 203 of FIG. 2), and may be a smart phone, tablet computer, laptop or the like. Device 300 may include a central processing unit (CPU) 301 (which may include one or more computer readable storage mediums), a memory controller 302, one or more processors 303, a peripherals interface 304, RF circuitry 305, audio circuitry 306, a speaker 321, a microphone 322, and an input/output (I/O) subsystem 311 having display controller 318, control circuitry for one or more sensors 319 and input device control 320. These components may communicate over one or more communication buses or signal lines in device 300. It should be appreciated that device 300 is only one example of a portable multifunction device 300, and that device 300 may have more or fewer components than shown, may combine two or more components, or a may have a different configuration or arrangement of the components. The various components shown in FIG. 3 may be implemented in hardware or a combination of hardware and software, including one or more signal processing and/or application specific integrated circuits.

Memory (or storage) 308 may include high-speed random access memory (RAM) and may also include non-volatile memory, such as one or more magnetic disk storage devices, flash memory devices, or other non-volatile solid-state memory devices. Access to memory 308 by other components of the device 300, such as processor 303, and peripherals interface 304, may be controlled by the memory controller 302. Peripherals interface 304 couples the input and output peripherals of the device to the processor 303 and memory 308. The one or more processors 303 run or execute various software programs and/or sets of instructions stored in memory 308 to perform various functions for the device 300 and to process data. In some embodiments, the peripherals interface 304, processor(s) 303, decoder 313 and memory controller 302 may be implemented on a single chip, such as a chip 301. In other embodiments, they may be implemented on separate chips.

RF (radio frequency) circuitry 305 receives and sends RF signals, also known as electromagnetic signals. The RF circuitry 305 converts electrical signals to/from electromagnetic signals and communicates with communications networks and other communications devices via the electromagnetic signals. The RF circuitry 305 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 305 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

Audio circuitry 306, speaker 320, and microphone 321 provide an audio interface between a user and the device 300. Audio circuitry 306 may receive audio data from the peripherals interface 204, converts the audio data to an electrical signal, and transmits the electrical signal to speaker 321. The speaker 321 converts the electrical signal to human-audible sound waves. Audio circuitry 306 also receives electrical signals converted by the microphone 321 from sound waves, which may include encoded audio, described above. The audio circuitry 306 converts the electrical signal to audio data and transmits the audio data to the peripherals interface 304 for processing. Audio data may be retrieved from and/or transmitted to memory 308 and/or the RF circuitry 305 by peripherals interface 304. In some embodiments, audio circuitry 306 also includes a headset jack for providing an interface between the audio circuitry 206 and removable audio input/output peripherals, such as output-only headphones or a headset with both output (e.g., a headphone for one or both ears) and input (e.g., a microphone).

I/O subsystem 311 couples input/output peripherals on the device 300, such as touch screen 315 and other input/control devices 317, to the peripherals interface 304. The I/O subsystem 311 may include a display controller 318 and one or more input controllers 320 for other input or control devices. The one or more input controllers 320 receive/send electrical signals from/to other input or control devices 317. The other input/control devices 317 may include physical buttons (e.g., push buttons, rocker buttons, etc.), dials, slider switches, joysticks, click wheels, and so forth. In some alternate embodiments, input controller(s) 320 may be coupled to any (or none) of the following: a keyboard, infrared port, USB port, and a pointer device such as a mouse, an up/down button for volume control of the speaker 321 and/or the microphone 322. Touch screen 315 may also be used to implement virtual or soft buttons and one or more soft keyboards.

Touch screen 315 provides an input interface and an output interface between the device and a user. Display controller 318 receives and/or sends electrical signals from/to the touch screen 315. Touch screen 315 displays visual output to the user. The visual output may include graphics, text, icons, video, and any combination thereof. In some embodiments, some or all of the visual output may correspond to user-interface objects. Touch screen 315 has a touch-sensitive surface, sensor or set of sensors that accepts input from the user based on haptic and/or tactile contact. Touch screen 315 and display controller 318 (along with any associated modules and/or sets of instructions in memory 308) detect contact (and any movement or breaking of the contact) on the touch screen 315 and converts the detected contact into interaction with user-interface objects (e.g., one or more soft keys, icons, web pages or images) that are displayed on the touch screen. In an exemplary embodiment, a point of contact between a touch screen 315 and the user corresponds to a finger of the user. Touch screen 215 may use LCD (liquid crystal display) technology, or LPD (light emitting polymer display) technology, although other display technologies may be used in other embodiments. Touch screen 315 and display controller 318 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 315.

Device 300 may also include one or more sensors 316 such as optical sensors that comprise charge-coupled device (CCD) or complementary metal-oxide semiconductor (CMOS) phototransistors. The optical sensor may capture still images or video, where the sensor is operated in conjunction with touch screen display 315. Device 300 may also include one or more accelerometers 207, which may be operatively coupled to peripherals interface 304. Alternately, the accelerometer 207 may be coupled to an input controller 314 in the I/O subsystem 311. The accelerometer is preferably configured to output accelerometer data in the x, y, and z axes.

In some illustrative embodiments, the software components stored in memory 308 may include an operating system 309, a communication module 310, a text/graphics module 311, a Global Positioning System (GPS) module 312, audio decoder 313 and applications 314. Operating system 309 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components. Communication module 310 facilitates communication with other devices over one or more external ports and also includes various software components for handling data received by the RF circuitry 305. An external port (e.g., Universal Serial Bus (USB), Firewire, etc.) may be provided and adapted for coupling directly to other devices or indirectly over a network (e.g., the Internet, wireless LAN, etc.

Text/graphics module 311 includes various known software components for rendering and displaying graphics on the touch screen 315, including components for changing the intensity of graphics that are displayed. As used herein, the term "graphics" includes any object that can be displayed to a user, including without limitation text, web pages, icons (such as user-interface objects including soft keys), digital images, videos, animations and the like. Additionally, soft keyboards may be provided for entering text in various applications requiring text input. GPS module 312 determines the location of the device and provides this information for use in various applications. Applications 314 may include various modules, including navigation software, mapping, address books/contact list, email, instant messaging, and the like. Navigation applications may be natively executed and operated on device 300, allowing users to enter and process navigational and/or mapping data, as will be described in greater detail below.

Figure 4:
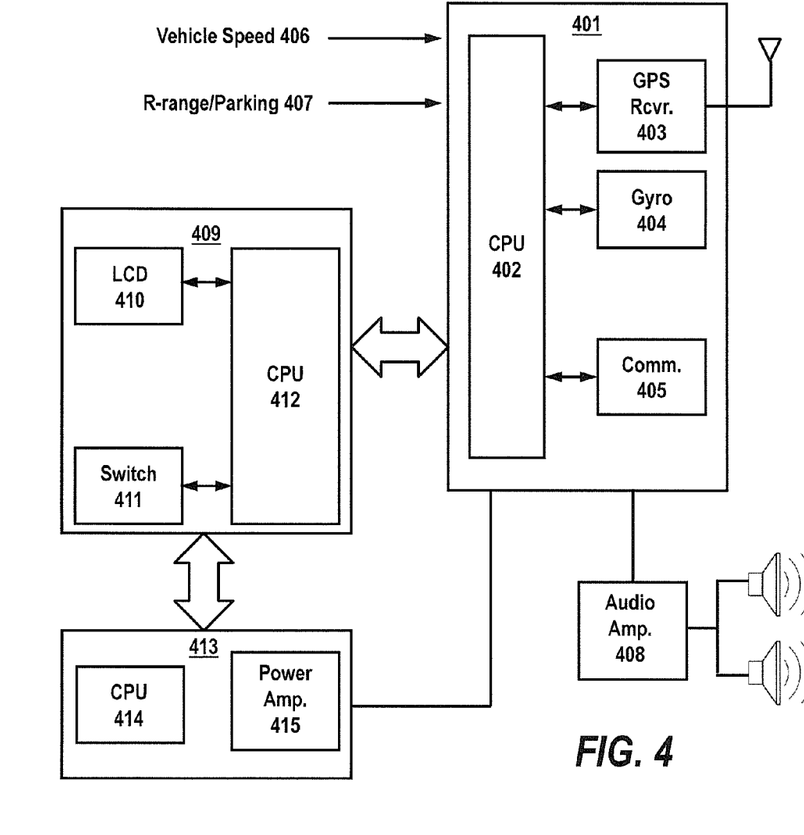
FIG. 4 is an exemplary bock diagram of a vehicle navigational system suitable for use in the exemplary system of FIG. 1 under one embodiment.

Turning now to FIG. 4, an exemplary vehicle navigation system is disclosed comprising a car navigation unit 401 comprising a CPU 402, GPS receiver 403 and gyroscope 404. Additionally, navigation unit 401 may include communications 405, allowing navigation unit 401 to communicate with portable devices, such as device 300, discussed above. Navigation unit may receive vehicle speed signal 406 and R-range/parking signal 407 to track vehicle movement and status. Navigation unit 401 utilizes GPS receiver 403 to acquire position data to locate the user on a road in the unit's map database. Using a road database, unit 401 can give directions to other locations along roads also in its database. Dead reckoning using distance data from sensors attached to the drivetrain, gyroscope 405 and an accelerometer (not shown) can be used for greater reliability, as GPS signal loss and/or multipath can occur due to urban canyons or tunnels.

The road database for navigation unit 401 may be a vector map containing some area of interest. Street names or numbers and house numbers may be encoded as geographic coordinates so that a user can find some desired destination by street address or, as will be discussed in greater detail below, by a generic or specific name. Points of interest (waypoints) may also be stored with their geographic coordinates. Point of interest specialties include speed cameras, fuel stations, public parking, and so forth. Contents can be produced by the user base as a vehicle drive along existing streets (cellular, Wi-Fi) and communicating via the internet, yielding an up-to-date map. Navigation mapping formats may include geographic data files (GDF), and may also include other formats, such as CARiN, SDAL and NDS PSF.

Navigation unit 401 may be further coupled to LCD unit 409 and audio unit 413, where LCD unit 409 may comprise LCD screen 410, CPU 412 and on/off switch 411. Audio unit 413 may comprise CPU 414 and power amplifier 415. Output of audio unit 413 may be forwarded to audio amplifier 408 for output to a user.

Figure 5:
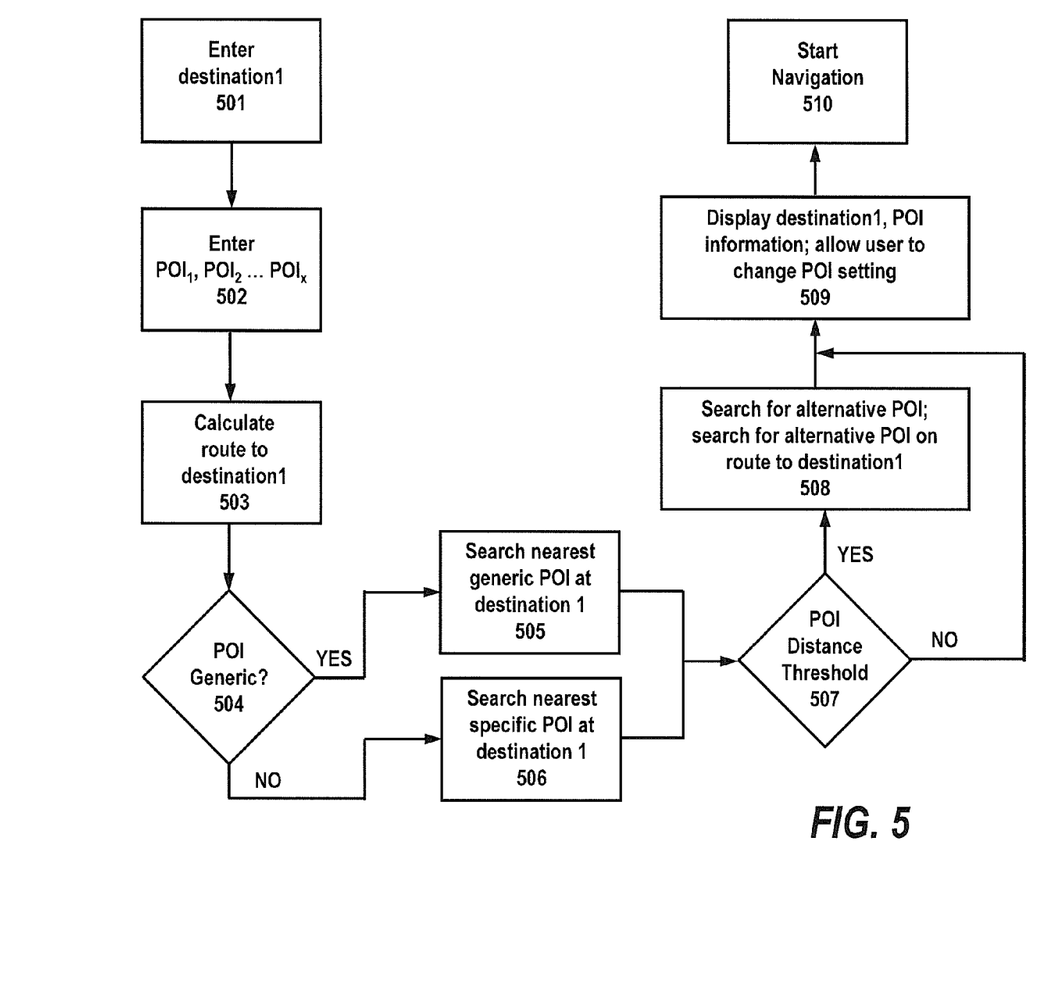
FIG. 5 is an exemplary flow diagram illustrating a process for clustering points of interest (POI) under an exemplary embodiment.

Turning to FIG. 5, an exemplary process is shown for clustering POIs processed for a user. In one embodiment, the process of FIG. 5 may be performed on a portable device, such as the one illustrated in FIG. 3. In another embodiment, the process of FIG. 5 may be performed on a navigation unit, such as the one illustrated in FIG. 4. In still a further embodiment, the process of FIG. 5 may be shared between a portable device and a navigation unit. Such an embodiment is particularly advantageous in that computationally expensive processes may be performed on the portable device.

In step 501, a user enters a destination (destination1) into a navigation system, and/or a navigation application executed on a portable device. In step 502, a user may enter multiple POIs ($POI_1$, $POI_2$ . . . $POI_x$) into the navigation application. In step 503, the navigation application calculates a route to the destination, and may perform further processing to determine locations of POIs nearest the destination. In step 504, the navigation application determines if the POI entries are generic (e.g., "gas station", "bank", "restaurant") and/or specific to a generic category (e.g., "BP", "Bank of America", "TGI Fridays"). Such a determination may be made by matching entries to a POI database and processing to establish categories. If an entry is generic (YES), the navigation processor looks for all generic POIs near the destination. If an entry is specific (NO), the navigation processor similarly looks for all specific POIs near the destination. The clustered POIs are then processed in 507 to see if their distance to the destination exceeds a given threshold (e.g., 5 miles). If the destination(s) exceed the distance threshold (YES), the navigation application searches for alternative POIs and may search for alternative POIs on route to the destination. In this embodiment, POIs may be separately clustered based on a search result and proximity. If the destination(s) do not exceed the distance threshold (NO), the processor causes screen or display to show the destination, together with the POI and/or clustered POI information in 509. Depending on the result, a user may be given further options to change the POI setting to better match a user preference. Afterwards, navigation 510 may be initiated in which the most efficient (or preferred efficient) route to the destination, together with the clustered POIs, is executed.

Figure 6:
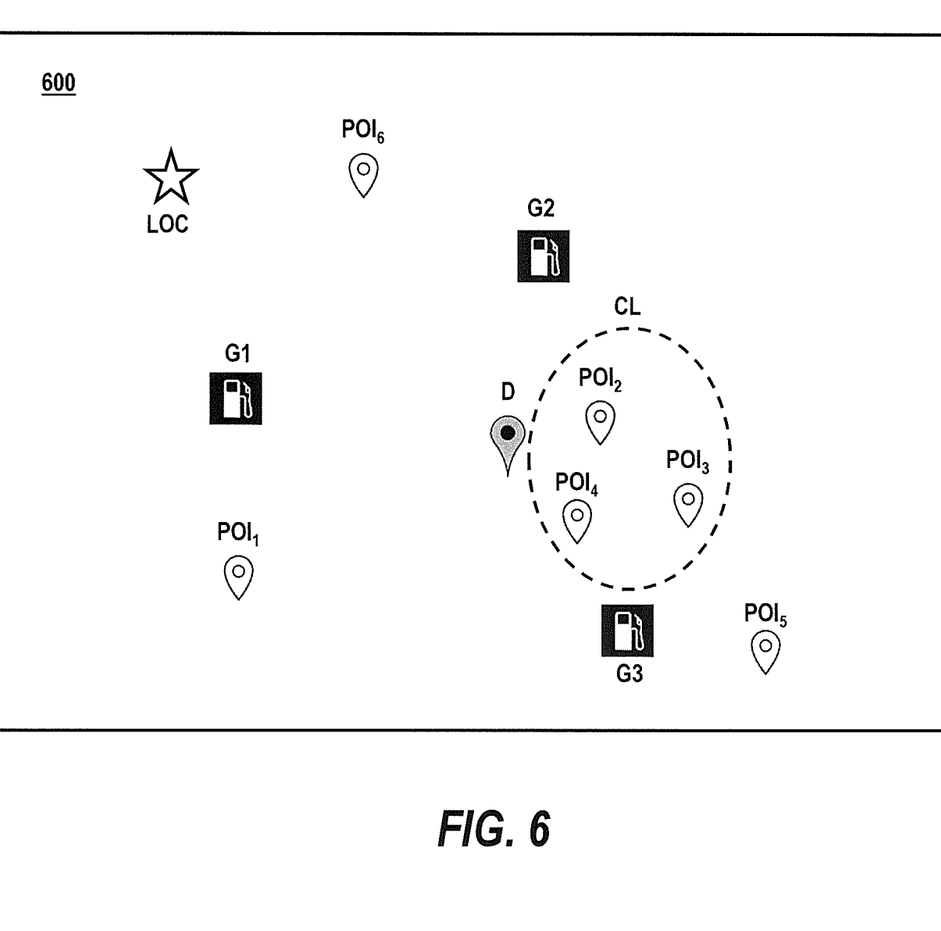
FIG. 6 illustrates an exemplary map display showing multiple POIs, along with a clustered POI and supplementary related POIs under one exemplary embodiment.

FIG. 6 illustrates an exemplary screen result based on processing illustrated in the example of FIG. 5. Here a user enters destination (D) and POI data from an originating location (LOC). After entering one or more generic and/or specific POIs, the processor generates a plurality of POI information ($POI_1$-$POI_6$) relating to the destination area (D). After engaging in proximity processing the POIs deemed to be in closest proximity, or containing the most efficient route ($POI_2$-$POI_4$), are clustered (CL) as shown in the figure. After the cluster CL is presented and approved by the user, the navigation application provides routing information to the user to provide an efficient route for the destination (D) and POIs ($POI_2$-$POI_4$). In addition, the navigation application may further provide supplementary POI information relating to the optimized route, such as gas stations (G1-G3) along the route.

As can be appreciated by those skilled in the art, the present disclosure provides a POI clustering features that provides various advantages. In one embodiment, the navigation may be enabled by a companion iOS or Android app that would allow the user to enter the list of POIs desired. Leveraging the computational power of the mobile devices, the app may calculate the most convenient and efficient route to allow the user to stop by all the POIs. The route may also be communicated to a vehicle's head unit automatically in one embodiment. On a vehicle side, a navigation system may display the route to the user, monitor the vehicle's fuel level, and when applicable, notify driver to a nearby, on the route, gas station for refueling.

The user may enter a destination and in an additional field provide entries such as "bank, pharmacy, Wal-Mart" in the navigation system of the vehicle. The navigation system may present to the user at least one suggestion of a route to the entered destination and, starting from the destination, an optimized route to the desired POIs. If the user provided generic names, like "bank" or "pharmacy", the navigation system will provide the nearest bank and pharmacy at the destination independent of the brand or name of the corresponding POI. If the user provided a specific name, like "Bank of America", "CWS Pharmacy" and "Wal-mart", the navigation system will search for the specific POIs. If the distance or time to a specific POI exceeds a (user definable) first threshold, the navigation system additionally suggests an alternative POI, if possible, with the possible time or distance to travel reduction. In one example, the navigation system may provide "Well Fargo instead of Bank of America: −7 miles; Target instead of Walmart: −12 miles". If the user would choose "Well Fargo instead of Bank of America", the alternative for "Target instead of Walmart" would be recalculated, because the route was changed and "Target instead of Walmart" might or might not be an economic alternative anymore.

In one embodiment, a user may define in settings that a search for "bank" always searches for a specific bank (e.g. Bank of America) or gas always searches for "BP". If one of the POIs would exceed a second threshold, the navigation would search for an economic route that would include a stop along the main route to the destination. The system could, for example prompt the user: "From <destination1> the nearest Walmart is 35 miles away, do you want to stop over in <destination2>; (+4.3 miles) instead? YES/NO". In another setting option, the user can define that the navigation system will always first search for economic stopovers along the main route to the destination to visit the desired POIs before searching the POIs at the destination entered.

Another example could be as a user is planning his weekend, he knows he needs to visit a friend at a nearby town. He also knows he still has to do his weekend shopping. In this clustering algorithm example, the user may be allowed to input a destination at his friend's house. From that point, the user can enter several POIs such as Target, Walmart, Costco, Bank, and a coffee shop to enjoy afternoon time with his friend. The algorithm will then automatically search for a cluster nearby the friends house which will include all the stores that the user can easily reach without driving around the town too much.

This clustering algorithm can also work for locations near a current location, near current route, or near a destination as already described above. Once the user finds the cluster of shops that he likes to visit over the weekend, he could also set other parameters such as departure time, arrival time. This way, the clustering algorithm can calculate the most optimal route for the user based on current traffic or future traffic prediction. The algorithm can also rearrange the orders of the shops to attend to make sure that the user doesn't go to a store before its opening time. Furthermore, the information regarding these clusters of shops will also be available for the user. These can include, store opening times, reviews from Yelp or other sources, and reservation availability.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A navigation system, comprising:
a processor;
a sensor, operatively coupled to the processor, the sensor being configured to determine a location of the navigation system;
an input, operatively coupled to the processor, wherein the input is configured to receive destination data, specifying a destination, and point-of-interest (POI) data specifying a plurality of generic or specific POIs from a user,
wherein the processor is configured to process the destination data and the plurality of generic and specific POIs to determine a plurality of POIs that are in closest proximity to the destination and clustering the POIs for presentation on a navigational map,
wherein the processor is configured to determine at least one alternate POI that is in closest proximity to the destination based on a predetermined distance threshold in response to a determination that the clustered POIs exceed the predetermined distance threshold.

2. The navigation system of claim 1, wherein the POI data comprises specific POIs that are associated with one or more generic POIs, and wherein the processor is configured to cluster at least one of a plurality of generic and specific POIs.

3. The navigation system of claim 1, wherein the processor is further configured to generate a route from the location of the navigation system, the destination and at least one of the POIs in the navigational map based on at least one of speed and distance.

4. The navigation system of claim 1, further comprising communications configured to transmit at least one of the location, destination and POIs to a remote navigation system.

5. A processor-based method for operating a navigation system, comprising:
determining a location of the navigation system;
receiving destination data, specifying a destination, and point-of-interest (POI) data, specifying a plurality of generic or specific POIs, processing, in a processor, the destination data and the POI data to determine a plurality of POIs that are in closest proximity to the destination and clustering the POIs for presentation on a navigational map; and
determining at least one alternate POI, based on the received POI data, that is in closest proximity to the destination based on a predetermined distance threshold in response to a determination that the clustered POIs exceed the predetermined distance threshold.

6. The processor-based method of claim 5, wherein the POI data comprises generic POIs.

7. The processor-based method of claim 6, wherein the POI data comprises specific POIs that are associated with one or more generic POIs, and wherein the clustering comprises clustering at least one of a plurality of generic and specific POIs.

8. The processor-based method of claim 5, further comprising generating a route from the location of the navigation system, the destination and at least one of the POIs in the navigational map based on at least one of speed and distance.

9. The processor-based method of claim 5, further comprising transmitting at least one of the location, destination and POIs to a remote navigation system.

10. A navigation system, comprising:

a processor;

a sensor, operatively coupled to the processor, the sensor being configured to determine a location of the navigation system; and an input, operatively coupled to the processor, wherein the input is configured to receive destination data, specifying a destination, and specifying point-of-interest (POI) data from a user, wherein the processor is configured to process the destination data and the POI data to determine a plurality of POIs that are in closest proximity to the destination and clustering the POIs for presentation on a navigational map, wherein the processor is further configured to generate a route from the location of the navigation system, the destination and at least one of the POIs in the navigational map based on at least one of speed and distance, and wherein the processor is configured to determine at least one alternate POI that is in closest proximity to the destination based on a predetermined distance threshold in response to a determination that the clustered POIs exceed the predetermined distance threshold, wherein the POI data comprises generic POIs, and specific POIs, and wherein the processor is configured to cluster at least a plurality of generic and specific POIs on the navigational map.

11. The navigation system of claim 10, further comprising communications configured to transmit at least one of the location, destination and POIs to a remote navigation system.

* * * * *